United States Patent [19]

Kanner et al.

[11] 4,067,828

[45] Jan. 10, 1978

[54] FORMATION OF HIGH-RESILIENCE URETHANE FOAM IN THE PRESENCE OF MORPHOLINO-BEARING POLYALKYLSILOXANES

[75] Inventors: Bernard Kanner, West Nyack; Bela Prokai, Mahopac, both of N.Y.

[73] Assignee: Union Carbide Corporation, New York, N.Y.

[21] Appl. No.: 776,270

[22] Filed: Mar. 10, 1977

Related U.S. Application Data

[62] Division of Ser. No. 592,076, June 30, 1975, Pat. No. 4,016,163.

[51] Int. Cl.$^2$ .................. C08K 5/54; C08G 18/48
[52] U.S. Cl. ............................. 260/2.5 AH
[58] Field of Search .................... 260/2.5 AH

[56] References Cited

U.S. PATENT DOCUMENTS

| | | | |
|---|---|---|---|
| 3,272,762 | 9/1966 | Ibbotson | 260/2.5 AH |
| 3,278,465 | 10/1966 | Twitchett | 260/2.5 AH |
| 3,560,544 | 2/1971 | Haluska | 260/2.5 AH |
| 3,642,670 | 2/1972 | Kanner | 260/2.5 AH |
| 3,658,867 | 4/1972 | Prokai | 260/2.5 AH |
| 4,016,163 | 4/1977 | Kanner | 260/2.5 AH |
| 4,018,723 | 4/1977 | Kanner | 260/2.5 AH |

FOREIGN PATENT DOCUMENTS 1,044,629  10/1966  United Kingdom.

*Primary Examiner*—C. Warren Ivy
*Attorney, Agent, or Firm*—Marylin Klosty

[57] ABSTRACT

The formation of high-resilience polyurethane foam is provided by the use, as the foam-stabilizing component, of a particular class of morpholino-bearing polyalkylsiloxanes which consist essentially of: (1) monofunctional siloxy units (M°) the respective silicon atoms of which have two alkyls bonded thereto, the third silicon-bonded organic group being alkyl or Q where Q is morpholinoalkyl- or morpholinoalkoxyalkyl, (2) an average of from about 0.5 to about 8 moles of difunctional dialkylsiloxy units for every two moles of M°, and (3) from zero up to an average of about 8 moles, for every two moles of M°, of difunctional monoalkylsiloxy units in which the second organic group bonded to silicon is Q, provided an average of at least about 0.5 and no more than about 8 moles of said silicon-bonded Q groups are present in the siloxanes for every two moles of M°. In addition to such morpholinoalkyl- and morpholinoalkoxyalkyl-polyalkyl-siloxanes, the high-resilience polyurethane foam formulations employed in the method of the invention, contain an organic polyol reactant comprising a polyether polyol reactant having an average primary hydroxyl content of at least about 35 mole percent based on the total moles of hydroxyl groups contained in said polyether polyol. The polyol reactant may additionally conprise a polymer/-polyether polyol.

16 Claims, No Drawings

FORMATION OF HIGH-RESILIENCE URETHANE FOAM IN THE PRESENCE OF MORPHOLINO-BEARING POLYALKYLSILOXANES

This application is a division of our prior and copending application Ser. No. 592,076, filed June 30, 1975, now U.S. Pat. No. 4,016,163.

BACKGROUND OF THE INVENTION

The present invention relates to a particular novel class of substituted polyalkylsiloxanes and to the use thereof in the formation of high resilience polyurethane foam.

It is well known to the art that urethane polymers are provided by the reaction of organic polyisocyanates and active hydrogen-containing organic compounds such as, for example, polyether polyols. It is also well known that the reaction is usually effected in the presence of one or more activators and that blowing action is provided when cellular products are desired. In producing conventional flexible polyether urethane foam, the rate of reaction and heat generated by the exothermic reaction between the polyisocyanate and polyether polyol is sufficient to cure the center of the foam product but the surface temperature usually does not rise high enough to cure the outside rapidly. Consequently, extended high temperature post cure treatment is necessary in commercial practice to provide a foamed product of satisfactory overall properties.

A relatively recent advance in polyurethane foam technology is the advent of reaction mixtures having a sufficiently high reactivity to provide faster and more complete reactions during polymer formation and expansion. As a result, overall processing time including high temperature post curing, if any, is substantially reduced. Basically, the more highly exothermic nature of such reaction mixtures is provided by the employment of polyether polyols having a high content of primary hydroxyl groups. Such foams are especially desirable for cushioning applications in view of their excellent physical properties. Among these properties are reduced combustibility relative to conventional polyether foam, low flex fatigue which means long life as a cushioning material, and high resiliency which is usually from about 55 to about 70 percent, as measured by standard test procedure ASTM D-1564-69. In view of this latter characteristic, such foams are commonly referred to as "high resilience" foam.

Because of the rapid buildup of gel strength of high resilience foam systems, the foam can sometimes be provided without a surfactant. Typically, however, high resilience foams produced without a surfactant or stabilizer have very irregular cell structure. It is usually desirable, therefore, to include a silicone surfactant as an additional component of high resilience foam formulations in order to control cell uniformity and to minimize the tendency of the foam to settle. Surfactants required for stabilization of conventional flexible polyether foam are unsatisfactory for high resilience foam because they overstabilize, causing extremely tight foam and excessive shrinkage. If the problem is sought to be corrected by reducing the concentration of such surfactants to a level which eliminates shrinkage, the cells are no longer stabilized satisfactorily and the foam structure becomes irregular and coarse.

It is known that specific low viscosity unmodified dimethylsilicone oils having a narrow low molecular weight distribution are useful stabilizers for high resilience foam. Among other classes of surfactants for high resilience foam are: (1) the relatively low molecular weight polysiloxane-polyoxyalkylene copolymers described in U.S. Pat. Nos. 3,741,917; (2) the particular class of aralkyl-modified siloxanes described in U.S. Pat. No. 3,839,384; (3) the cyanoalkyl- and cyanoalkoxy-modified siloxanes described in Belgian Pat. No. 809,978; and (4) the cyanoalkoxyalkyl- and cyanoalkoxyalkoxy-modified siloxanes described in Belgian Pat. No. 809,979.

It is a principal object of the present invention to provide a new class of siloxanes which are especially useful as surfactant components of polyurethane foam formulations containing a polyether polyol reactant having a high primary hydroxyl content, such as, in particular, high resilience foam formulations. Various other objects and advantages of the present invention will become apparent to those skilled in the art from the accompanying description and disclosure.

As a preface to the description of the present invention, it is noted that our copending application Ser. No. 552,996, filed Feb. 25, 1975; now U.S. Pat. No. 4,018,723, describes and claims a particular class of morpholino-bearing polyalkylsiloxane-polyoxyalkylene copolymers, and a method for providing flexible polyether and polyester urethane foam in the presence of the copolymers as foam stabilizers. The said copending application, however, does not describe the particular class of siloxanes to which the teachings of the present invention pertain.

SUMMARY OF THE INVENTION

In accordance with one aspect of the present invention a particular class of morpholino-bearing polyalkylsiloxanes are provided which consist essentially of: (1) monofunctional siloxy units (M°) the respective silicon atoms of which have two alkyls bonded thereto, the third silicon-bonded organic group being alkyl or a morpholino-substituted organic group (Q); (2) an average of from about 0.5 to about 8 moles of dialkylsiloxy units (X) for every two moles of M°; and (3) from zero up to an average of about 8 moles, for every two moles of M°, of difunctional monoalkylsiloxy units (Y) in which the second organic group bonded to silicon is a morpholino-substituted organic group (Q), provided an average of at least about 0.5 and no more than about 8 moles of the morpholino-substituted groups (Q) are present in the said morpholino-bearing polyalkylsiloxanes per two moles of M°.

As indicated, the essential silicon-bonded morpholino-bearing groups of the siloxanes of the present invention are collectively referred to herein by the symbol "Q" and include any of the monovalent morpholinoalkyl and morpholinoalkoxyalkyl radicals encompassed by the formula,

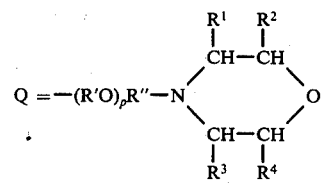

where: $p$ is 0 or 1; R' is bivalent alkylene having from two to four carbon atoms; R" is bivalent alkylene having from two to six carbon atoms; and $R^1$, $R^2$, $R^3$ and $R^4$ are independently hydrogen or alkyl having from one to four carbon atoms.

The remaining organic groups bonded to silicon of the siloxanes described herein are alkyls, referred to herein by the symbol "R". As defined for the purpose of the entire specification, the symbol "R" denotes alkyls of one to four carbon atoms.

In the monofunctional siloxy units encompassed by M°, the respective silicon atoms are bonded to two alkyls (R), the third silicon-bonded organic group being Q or alkyl (R). Thus, included within the scope of M° are monofunctional siloxy units having the following unit formulae which for brevity are also individually referred to herein as the M and M' units as shown;

$$M = (R)_3SiO_{1/2}$$

$$M' = (Q)(R)_2SiO_{1/2}$$

In any given siloxane composition of the present invention, the M° units may be the same as or different from one another.

In the difunctional siloxy units at least one of the two organic groups bonded to the respective silicon atoms is alkyl and the second silicon-bonded organic group is either alkyl as in the X units or the aforesaid morpholino-substituted group (Q) as in the Y units when the latter units are present. Thus, the difunctional X and Y units have the following respective unit formulae:

$$X = (R)_2SiO_{2/2}$$

$$Y = (Q)(R)SiO_{2/2}$$

The morpholino-bearing polyalkylsiloxanes described herein may contain any combination or subcombination of the respective siloxy units within the scope of M°, X and Y provided the average composition contains from about 0.5 to about 8 moles of X and from about 0.5 to about 8 moles of Q for every two moles of M°. Usually, the Q-modified polyalkylsiloxanes of the invention contain, on the average, from about one to about six moles of X units and no more than about six moles of Q, for every two moles of M°.

Consistent with the above definition and, from the standpoint of the nature and relative proportion of monomeric siloxy units, the Q-modified polyalkylsiloxanes of the present invention have the following average composition, as expressed on the normalized basis of two moles of total monofunctional units (M°), that is, per average mole of polymer:

$$[(Q)(R)_2SiO_{1/2}]_q[(R)_3SiO_{1/2}]_r[(R)_2SiO_{2/2}]_x[(R)(Q)SiO_{2/2}]_y \quad (I)$$

wherein:
Q is silicon-bonded morpholinoalkyl or morpholinoalkoxyalkyl as previously defined;
R is alkyl of one to four carbon atoms;
$q$ is 0 or any positive number having an average value of no more than 2, $r$ is 0 or any positive number having an average value of no more than 2, and the average value of the sum $q+r$ is 2;
$x$ has an average value from about 0.5 to about 8; and
$y$ is 0 or any positive number having an average value of no more than about 8, provided the average value of the sum $q+y$ is at least about 0.5 and no more than about 8.

It is evident, therefore, that the sum $q+y$ corresponds to the total number of Q groups contained in an average mole of polymer and that when either $q$ or $y$ is 0, the other must be at least 0.5. It is also evident that when both $q$ and $r$ are positive numbers, the siloxanes of the invention contain both types of the respective monofunctional units.

The morpholinoalkyl- and morpholinoalkoxyalkyl-polyalkylsiloxanes of the invention are generally useful as surfactant providing compositions, and find particular application in the formation of high resilience foam.

Accordingly, another aspect of the present invention provides a method for producing high resilience polyurethane foam. The method comprises reacting and foaming a reaction mixture containing: (a) an organic polyol reactant comprising a polyether polyol having an average primary hydroxyl content between about 35 and about 90 mole percent and an average hydroxyl functionality from 2.1 to about 5; (b) an organic polyisocyanate reactant containing at least two isocyanate groups per molecule; (c) a blowing agent; (d) a catalyst comprising a tertiary-amine; and (e) a foam stabilizing component comprising the morpholino-bearing polyalkylsiloxanes of the present invention. When high resilience foam of enhanced load-bearing properties is desired, the organic polyol reactant additionally contains a polymer/polyether polyol produced by the in situ polymerization of at least one ethylenically unsaturated monomer in a polyether polyol.

In their utilization for forming high resilience foam, the Q-modified polyalkylsiloxanes can be introduced to the foam producing reaction mixtures either as such, as a solution in a variety of organic liquids, in combination with various organic additives including organic surfactants, or in combination with one or more of the urethane-forming reactants, blowing agent or amine catalyst.

DETAILED DESCRIPTION OF THE INVENTION AND PREFERRED EMBODIMENTS

The functionality of the respective types of structural units encompassed by M°, X and Y of the siloxanes of this invention denotes the number of oxygen atoms to which the silicon atom (Si) of any particular unit is bonded. Since each oxygen atom is shared by a silicon atom (Si') of another unit, functionality also denotes the number of linkages by which the particular unit can be bonded to another portion of the polymer through —Si—O—Si'— bonds. Accordingly, in expressing the individual formulas of the respective units of the siloxanes of this invention, fractional subscripts are used in which the value of the numerator defines functionality (i.e., the number of oxygen atoms associated with the silicon atom of the particular unit), and the denominator, which in each instance is 2, denotes that each oxygen atom is shared with another silicon atom. In view of their monofunctionality, the M° units are chain terminating or end-blocking units and the respective oxygen atoms thereof are shared with silicon of one other unit which can be X and, when present, Y. On the other hand, X and Y are difunctional and thus the respective two oxygen atoms associated with each silicon atom thereof are shared with respective silicon atoms of other units. Thus, the reoccurring difunctional units may be distributed in the siloxane randomly, alternately, as sub-blocks of repeating units of the same type, or in any combination of such arrangements. Further, although the siloxane fluids of the invention can be discrete chemical compounds, they are usually mixtures of discrete siloxane species which differ in molecular weight and in the type, arrangement and relative proportions of units. Therefore, as expressed herein, the parameters employed to denote the relative proportions of units (e.g., $x$ and $y$) are average values and are based on the relative proportions of reactants from which the respective units are derived. It is to be further understood that, consistent with convention in the art to which the present invention pertains, as expressed herein, the formulas of the siloxane polymers indicate their overall average empirical composition rather than any particular ordered arrangement of units or molecular weight of any particular discrete siloxane species. With this understanding, the average composition of the respective types of morpholinoalkyl- and morpholinoalkoxyalkyl-polyalkylsiloxanes encompassed by Formula I above may be expressed by the following formulae wherein the various siloxy units are shown in chemically combined form and the various parameters are again expressed on the basis of an average mole of polymer:

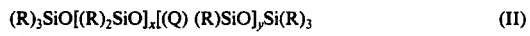  (II)

  (III)

  (IV)

wherein: the average value of $x$ ranges from about 0.5 to about 8, and is usually at least about one and no more than about 6; the total average number of morpholino-bearing or Q groups is from about 0.5 to about 8 and is usually no more than about 6; and, in Formula IV, $q$ and $r$ are positive numbers provided their sum is 2. It is evident, therefore, that: (1) in Formula II, the average value of $y$ is at least about 0.5 and no more than about 8; (2) in Formula III, $y$ can be 0 or any positive number up to about 6; and (3) in Formula IV, the average value of $q+y$ is from about 0.5 to about 8, the maximum value of $y$ being 8 less the value of $q$. For example, in Formula IV, when $q$ is 0.5 (and thus $r$ is 1.5), $y$ may be 0, 0.1, 0.5, 0.8, 1.2, 1.5 and so forth up to a maximum value of 7.5. Further in regard to Formula IV, it is also evident that when $q$ has a value of less than 0.5 such as 0.25, the polymer must contain Y units and the corresponding minimum average value of $y$ is 0.25.

The silicon-bonded R groups are alkyls having from one to four carbon atoms including linear and branched alkyls. Illustrative of suitable groups encompassed by R are: methyl, ethyl, n-propyl, isopropyl, n-butyl and t-butyl. Of these, methyl is especially suitable. It is to be understood that the R groups may be the same throughout the siloxanes described herein or they may differ as between or within units without departing from the scope of this invention. For example, when the end-blocking monofunctional units are M, that is, $(R)_3SiO_{1/2}$—, they may be trimethylsiloxy units and the difunctional units, $R_2SiO_{2/2}$, may be diethylsiloxy and/or methylethylsiloxy units.

In the morpholinoalkyl and morpholinoalkoxyalkyl substituents (Q) of the siloxanes of this invention, that is, in

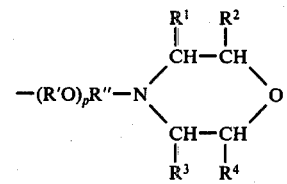

the $R^1$ through $R^4$ groups are, as previously defined, hydrogen or $C_1$ to $C_4$ alkyls. Usually, no more than two are alkyls as in the 2,6-dimethylmorpholino nucleus. Preferably, each of $R^1$, $R^2$, $R^3$ and $R^4$ is hydrogen. The R' and R'' groups of Q are bivalent alkylene radicals, of the series, —$C_cH_{2c}$— and —$C_dH_{2d}$—, respectively, where $c$ is an integer having a value from 2 to 4 (—R'—) and $d$ is an integer having a value from 2 to 6 (—R''—). Illustrative of the linear and branched bivalent alkylene radicals encompassed by —R'— and —R''— are: ethylene; 1,3-propylene; 1,2-propylene; 1,4-butylene; 1,2-butylene; 2,3-butylene; and, in addition —R''— can be 1,5-pentylene, 1,2-pentylene, 1,6-hexylene, and the like. Preferably, —R'— has from 2 to 3, and R'' has from 2 to 4, carbon atoms.

Illustrative of the Y units [(Q) (R)SiO$_{2/2}$] of which the siloxanes of the invention may be comprised are the following:

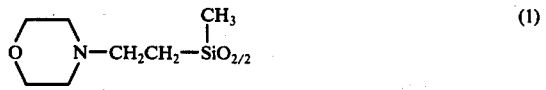  (1)

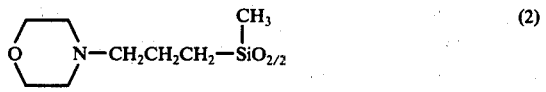  (2)

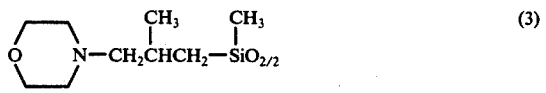  (3)

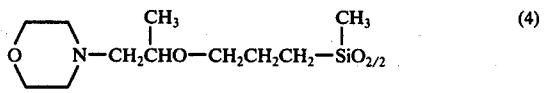  (4)

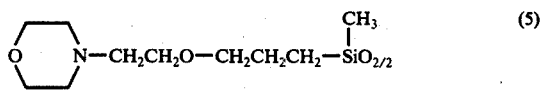  (5)

and corresponding units in which the silicon-bonded methyl group is ethyl, propyl, butyl, and the like. It is to be understood that the siloxanes of the present invention may contain any one of the various Y units illustrated by the above as essentially the sole type of Q-substituted difunctional unit or the siloxanes may be comprised of any combination thereof.

Illustrative of the Q-substituted monofunctional units (M') are corresponding morpholinoalkyl dialkylsiloxy units such as: 3-(morpholino)propyl dimethylsiloxy wherein Q is as in (2) above; and morpholinoalkoxyalkyl dialkylsiloxy such as 3-[2-(morpholino)-1-(methyl)ethoxy]propyl dimethylsiloxy wherein Q is as in (4) above.

The generally preferred Q-substituted polyalkylsiloxanes of the invention are the compositions defined by above Formulas I-IV in which R is methyl and, in the Q group, each of $R^1$ through $R^4$ is hydrogen. Illustrative of such generally perferred compositions within the scope of Formula II, for example, are those defined by the following Formulas II-A and II-B:

Me$_3$SiO[Me$_2$SiO]$_x$[MeSiO]$_y$SiMe$_3$      (II-A)
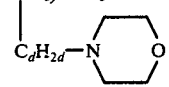

Me$_3$SiO[Me$_2$SiO]$_x$[MeSiO]$_y$SiMe$_3$      (II-B)
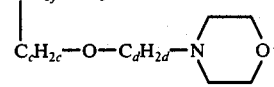

wherein: Me is methyl (—CH$_3$); $c$ is an integer from 2 to 4; $d$ is an integer from 2 to 6; the average value of $x$ is from about 0.5 to about 8, and is more usually from about one to about 6; and the average value of $y$ is from about 0.5 to about 8, and is more usually no nore than about 6. Most preferably, the morpholinoalkyl- and morpholinoalkoxyalkylpolyalkylsiloxanes of the invention contain an average of no more than about 4.5 moles of Q per two moles of monofunctional units. Thus, in above Formulas II-A and II-B, the average value of $y$ is most preferably no more than about 4.5.

The morpholinoalkyl- and morpholinoalkoxyalkyl-polyalkylsiloxanes of the invention are prepared by any one of a number of different types of reactions including hydrosilation and equilibration reactions, as described below.

The hydrosilation method, referred to herein as Method A, comprises the reaction of (a) equilibrated unmodified polyalkylsiloxane hydrides and at least one of reactants (b) and (c) as the source of Q where reactant (b) is an N-alkenylmorpholine having the formula,

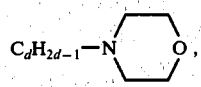

and reactant (c) is an N-[(alkenyloxy)alkyl]morpholine having the formula,

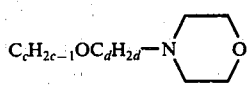

including corresponding reactants in which the morpholino nucleus is substituted with lower alkyls (that is, the C$_1$ to C$_4$ alkyls encompassed by R$^1$, R$^2$, R$^3$ and R$^4$ of the formula for Q). In such unsaturated morpholine reactants, $c$ and $d$ are previously defined in expressing the bivalent alkylene radicals, —R'— and —R''—, of Q as —C$_c$H$_{2c}$— and —C$_d$H$_{2d}$—, respectively. Thus, in each instance, $c$ is an integer from 2 to 4 and $d$ is an integer from 2 to 6. In providing Q-substituted polyalkylsiloxanes of the invention having a combination of silicon-bonded morpholinoalkyl and morpholinoalkoxyalkyl groups, the hydrosilation reaction is effected employing both reactant (b) and reactant (c) which may be fed to the reaction mixture either individually (simultaneously or sequentially) or in admixture.

In the application of Method A to polyalkylsiloxane hydrides in which the monofunctional units are trialkylsiloxy, the morpholino-bearing polyalkylsiloxane products are of the type encompassed by Formula II. This embodiment of Method A is as illustrated by the following equations 1 and 2:

Equation 1:

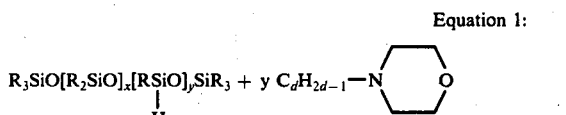

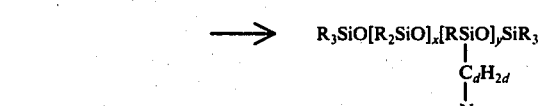

Equation 2:

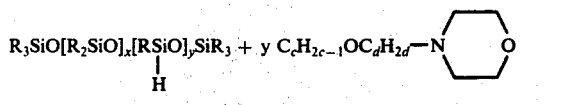

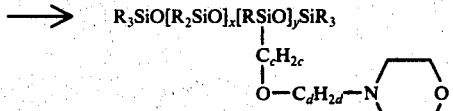

wherein: R is C$_1$ to C$_4$ alkyl; $c$ has a value from 2 to 4; $d$ has a value from 2 to 6; the average value of $x$ is from about 0.5 to about 8; and the average value of $y$ is from about 0.5 to about 8. When the respective reactions of equations 1 and 2 are effected employing polymethylsiloxane hydrides and N-allylmorpholine and N-[2-(allyloxy)propyl]morpholine, the products are corresponding 3-(morpholino)propyl- and 3-(morpholinoisopropoxy)propyl-substituted polymethylsiloxanes having the following Formulas II-A-1 and II-B-1, respectively:

Me$_3$SiO[Me$_2$SiO]$_x$[MeSiO]$_y$SiMe$_3$      (II-A-1)
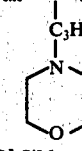

Me$_3$SiO[Me$_2$SiO]$_x$[MeSiO]$_y$SiMe$_3$      (II-B-1)
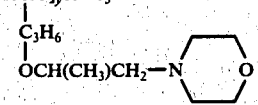

In the application of Method A to polyalkylsiloxane hydrides in which the monofunctional units are (H)(R)$_2$SiO$_{1/2}$, the morpholinoalkyl- and morpholinoalkoxyalkyl-polyalkylsiloxane products are of the type encompassed by Formula III. This embodiment of Method A is as expressed by the following equation 3 in which the N-alkenylmorpholines are illustrated as the source of Q.

Equation 3:

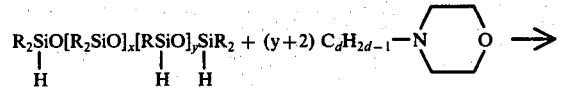

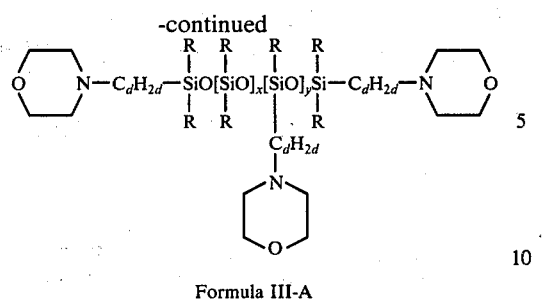

Formula III-A wherein: R, d and x are as previously defined herein; and y is 0 or a positive number having an average value no more than about 6. When the reaction of equation 3 is effected employing polymethylsiloxane hydrides and N-allylmorpholine, the products are corresponding 3-(morpholino)propyl-polymethylsiloxanes, that is, compositions having Formula III-A wherein R is methyl and d is 3. Further in regard to the reaction illustrated by equation 3, when y is zero, the morpholinoalkyl substituents are bonded solely to silicon of the monofunctional units, and the equilibrated polyalkylsiloxane hydride reactant has the average composition $(H)(R)_2SiO[R_2SiO]_xSi(R)_2(H)$.

Another embodiment of Method A comprises the utilization of equilibrated polyalkylsiloxane hydrides containing trialkysiloxy and hydrogen-dialkylsiloxy monofunctional units, as the hydrosilation reactant to provide morpholino-bearing polyalkylsiloxanes of the type defined by above Formula IV. This embodiment is expressed by the following equation 4 in which the N-alkenylmorpholines are illustrated as the source of Q.

Equation 4:

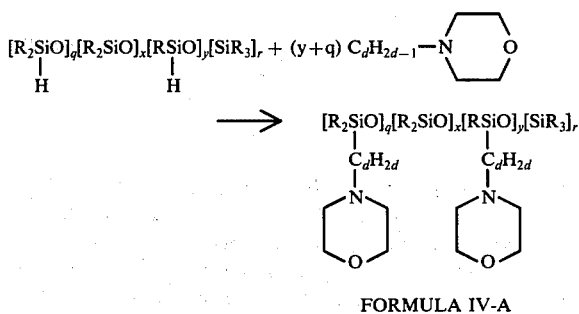

FORMULA IV-A wherein as defined with respect to Formula IV: $q$ and $r$ are positive numbers, the sum $Q+r$ being 2; $x$ has an average value from about 0.5 to about 8; $y$ is 0 or any positive number having a maximum average value of $8-q$; and the sum $q+y$ is at least about 0.5 and no more than about 8. Thus, when $y$ is 0, the minimum value of $q$ is 0.5. Likewise, when $q$ is less than 0.5, $y$ must be a positive number. When the reaction of equation 4 is effected employing polymethylsiloxane hydrides and N-allylmorpholine, the products are corresponding 3-(morpholino)propyl-polymethylsiloxanes, that is, compositions having above Formula IV-A wherein R is methyl and d is three.

It is to be understood that when the reactions of equations 3 and 4 are carried out employing the above-described N-[(alkenyloxy)alkyl]morpholine reactants in place of the N-alkenylmorpholines, corresponding products are provided in which

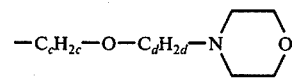

groups are bonded to silicon in place of

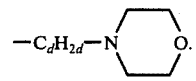

Overall, the above-discussed hydrosilation reactions comprise the addition of Si—H to the alkenyl group of the respective N-alkenylmorpholine and N-[(alkenyloxy)alkyl]morpholine reactants, and are effected in the presence of a platinum catalyst. Illustrative is platinum in the form of chloroplatinic acid dissolved, if desired, in a solvent such as tetrahydrofuran, ethanol, butanol, 1,2-dimethoxyethane or mixed solvents such as ethanol/1,2-dimethoxyethane. Also suitable as promoters of the hydrosilation reaction are the platinum catalysts prepared by reaction of chloroplatinic acid and an alcohol such as octanol as described in U.S. Pat. No. 3,220,972. It is to be understood, however, that other platinum derivatives known to the art as hydrosilation catalysts may also be used. The platinum is used in a catalytic amount such as, for example, from about 5 to about 400 parts by weight per million (p.p.m.) parts of the combined weight of the silicon-containing and morpholine reactants. The more usual platinum concentration is no more than about 200 p.p.m. Suitable reaction temperatures range from about room temperature (20° C.) to about 200° C., and are more usually from about 60° C. to about 160° C.

The hydrosilation reactions illustrated by and discussed in connection with equations 1 through 4, are carried out employing the unsaturated morpholine reactant in an amount at least sufficient to react with the silicon-bonded hydrogen content of the Si-H reactant. From the standpoint of more effective and substantially complete reaction of silanic hydrogen, the unsaturated reactant is usually employed in excess of stoichiometry. Thus the N-alkenylmorpholine and N-[(alkenyloxy)alkyl]morpholine reactants may be employed in an amount up to a 100 or more mole percent excess, although usually no more than about 60 mole percent in excess of the desired stoichiometry is required to obtain substantially complete reaction (95+ and more usually 98+ percent) of the silanic hydrogen of the hydrosilation reactant. Thus, any residual silanic hydrogen contained in the morpholinoalkyl- and morpholinoalkoxyalkyl-polyalkylsiloxanes of the invention usually corresponds to no more than about 5, and more usually no more than about 2, percent of the number of moles of Si—H contained in an average mole of the equilibrated polyalkylsiloxane reactant.

The hydrosilation reactions may be conducted in the absence or presence of a solvent. Illustrative solvents are any of the following employed individually or in combination with one another; the normally liquid aromatic hydrocarbons such as benzene, toluene and xylene; alcohols such as n-propanol and isopropanol; ethers; ether alcohols; and other such non polar or polar solvents. Upon completion of the hydrosilation reaction, excess organic reactant and any solvent employed in the siloxane preparation, may be removed by conventional separation techniques to obtain the final product comprising the morpholino-bearing polyalkylsiloxane compositions of the invention. It is to be understood, however, that some portion or all of the solvent and excess morpholine reactant including by-products thereof may remain in the product and that such diluted polymer compositions are within the scope and may be used in accordance with the teachings of this invention. The removal or neutralization of the platinum hydrosilation catalyst is usually desirable for long range product stability. Neutralization is readily effected by adding sodium bicarbonate to the reaction mixture followed by filtration of the resultant slurry to remove the neutralizing agent and platinum residues.

The polyalkylsiloxane hydride reactants employed in the hydrosilation reactions of equations 1 to 4 are in turn prepared by known equilibration reactions catalyzed by acid catalysts such as concentrated sulfuric acid, trifluoromethylsulfonic acid, and the like. Inasmuch as such equilibrated reactants are themselves usually mixtures of various discrete siloxane species, the morpholinoalkyl- and morpholinoalkoxyalkyl-polyalkylsiloxanes produced therefrom are also usually provided as mixtures of various discrete siloxane species, as previously described herein.

In addition to their preparation by hydrosilation reactions, a second method, referred to herein as Method B, for preparing the Q-substituted polyalkylsiloxanes of the invention comprises the base-catalyzed equilibration of various combinations of the precursor reactants described below as the source of the indicated siloxy units and Q.

a. Hexaalkyldisiloxanes, $R_3SiOSiR_3$, when the endblocking units are $R_3SiO_{1/2}$, that is, when $q$ of Formula I is 0 and $r$ is 2, as specifically shown in Formula II.

b. Di[morpholinoalkyl or morpholinoalkoxyalkyl]tetraalkyldisiloxanes, $(Q)(R)_2SiOSi(R)_2(Q)$, that is, when $r$ of Formula III is 0 and $q$ is 2, as specifically shown in Formula III. Such reactants in turn are prepared by hydrolysis of $(Q)(R)_2SiX°$ where $X°$ is chlorine or bromine, employing about one mole of water for every two moles of halide.

c. Cyclic dialkylsiloxane polymers, $[R_2SiO]_h$, where $h$ usually has an average value of from about 3 to about 6, as a source of the difunctional dialkylsiloxy units (X), $R_2SiO_{2/2}$.

d. Morpholinoalkyl- or morpholinoalkoxyalkylalkylsiloxane cyclic polymers as the source of the Y units, $(Q)(R)SiO_{2/2}$. These polymers are formed by the hydrolysis of $(Q)Si(R)Cl_2$, followed by the base-catalyzed dehydration-cyclization of the hydrolyzate to form cyclics having the formula, $[(Q)Si(R)O]_w$, where Q is as defined herein and the average value of $w$ is 3 or more.

Illustrative of the reactions encompassed by Method B is the reaction of equation 5 shown below which comprises equilibration of reactants (a), (c) and (d) and in which Q of reactant (d) is illustrated as morpholinoalkyl. For convenience, polymeric reactants (c) and (d) are shown in equation 5 simply as the siloxy units which they provide to the equilibrated reaction product.

Equation 5:

g $R_3SiOSiR_3$ + x' $[R_2SiO_{2/2}]$ + y' $[RSiO_{2/2}]$
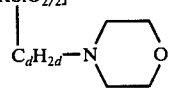

-continued
$\longrightarrow$ $R_3SiO[R_2SiO]_{x'}[RSiO]_{y'}SiR_3$
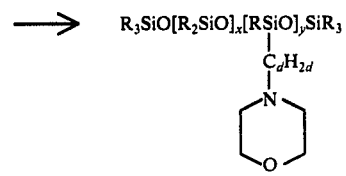

In above equation 5 and other equation hereinbelow, $g$ represents the actual number of moles of the indicated reactant, and $x'$ and $y'$ represent the actual number of moles (or mole-equivalents) of the indicated monomeric units provided by the polymeric source of such units. It is to be understood, therefore, that $g$, $x'$ and $y'$ can be any positive numbers depending upon the scale on which the reactions are run, provided that when normalized on the basis of $g = 1$ (that is, on the basis of an average mole of polymer or two moles of monofunctional units), the average value of each of $x'$ and $y'$ is from about 0.5 to about 8, thereby providing Q-substituted polyalkylsiloxanes wherein $x$ and $y$ have corresponding average values as previously defined.

The Q-modified polyalkylsiloxanes encompassed by Formula III-A (shown in above equation 3) may also be prepared by effecting the equilibration reaction of equation 5 in the presence of reactant (b) instead of reactant (a), as illustrated by the following modification of equation 5.

Equation 6:

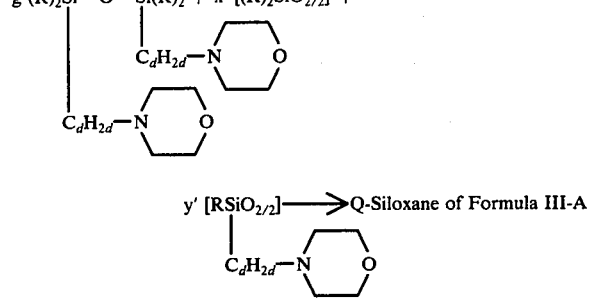

It is to be understood that equation 6 may also be effected employing di[morpholinoalkoxyalkyl]tetraalkyldisiloxanes in place of the di[morpholinoalkyl]tetraalkylsiloxanes shown in equation 6 to provide corresponding equilibrated morpholinoalkoxyalkyl-polyalkylsiloxanes.

The morpholinoalkyl- and morpholinoalkoxyalkylpolyalkylsiloxanes within Formula IV and Formula IV-A (shown in equation 4) in which the monofunctional units are trialkylsiloxy (M) and Q-substituted dialkylsiloxy (M'), may also be provided by effecting the above equilibration reactions in the presence of a combination of respective precursor reactants of the M and M' units. For example, such Q-substituted siloxanes of the invention are provided by effecting the equilibration reaction of equation 5 in the presence of both $R_3SiOSiR_3$ and $(Q)(R)_2SiOSi(R)_2(Q)$ in relative proportions predetermined by the total number of moles of the respective M and M' units desired in any given average mole of polymer.

The above-described equilibration reactions are promoted by basic catalysts. Illustrative of suitable alkaline equilibration catalysts are potassium silanolate, cesium hydroxide and tetramethyl ammonium silanolate. Such promoters are usually employed in concentrations of from about 30 to about 50 p.p.m., based on the total weight of reactants. The temperature at which base-catalyzed equilibration is carried out depends largely on the catalyst employed. Thus, when tetramethyl ammonium silanolate is used, suitable reaction temperatures are from about 75° C. to about 100° C., preferably from about 30°-90° C. The other alkaline catalysts usually require higher temperatures such as at least about 150° C. to about 200° C. When a diluent is used, it is conveniently separated from the reaction product by rotary vacuum evaporation. The Q-substituted polyalkylsiloxane fluids provided by the invention need not be fractionated such as by distillation but may be sparged (that is, stripped of lites) or unsparged.

The morpholinoalkyl- and morpholinoalkoxyalkyl-polyalkylsiloxane fluids of this invention are generally useful as surfactants and find particular application in the formation of high resilience foam. In their use as foam stabilizing components of high resilience foam formulations, the other essential types of components and reactants are an organic polyol reactant comprising a polyether polyol having a primary hydroxyl content from about 35 to about 90 mole percent, an organic polyisocyanate, an amine catalyst and a blowing agent. The Q-substituted polyalkylsiloxanes of the invention are present in the high resilience foam formulation in an amount between about 0.03 and about 3 parts by weight per one hundred parts by weight of total polyol reactant (p.p.h.p.). The more usual concentration is from about 0.05 to about 2 p.p.h.p.

The polyether polyol of which the organic polyol reactant is comprised has an average of from 2.1 to about 5 hydroxyl groups per molecule and an average primary hydroxyl content between about 35 and about 90 mole percent based on the total moles of hydroxyl groups in the polyol. For convenience, this class of polyols are referred to herein as Polyol I. This class of polyether polyols are typically derived from propylene oxide and ethylene oxide and an organic initiator or mixture of initiators of the alkylene oxide polymerization. The average number of hydroxyl groups in the polyols encompassed by Polyol I is achieved by control of the functionality of the initiator or mixture of initiators used in producing the polyol. The high primary hydroxyl content is provided by capping of the polyoxyalkylene chains with at least a portion of the total ethylene oxide feed. Both the oxyalkylation and capping reactions are preferably effected in the presence of a basic material such as, for example, potassium hydroxide. The hydroxyl numbers of this class of polyether polyols may be from 84 to 18 and are usually no more than about 45. As is well known, the hydroxyl number of a polyol is the number of milligrams of potassium hydroxide required for the complete hydrolysis of the fully acylated derivative prepared from 1 gram of polyol. The hydroxyl number is also defined by the following equation which reflects its relationship with the functionality and molecular weight of the polyol reactant:

$$\text{OH No.} = \frac{56.1 \times 1000 \times f}{M.W.}$$

where:
OH = hydroxyl number of the polyol; $f$ = average functionality, that is, average number of hydroxyl groups per molecule of polyol; and $M.W.$ = average molecular weight of the polyol.

In the polyols within the scope of Polyol I, the polyoxyalkylene chains may consist essentially of polyoxypropylene capped with oxyethylene or they may be constituted of polyoxypropylene and polyoxyethylene, provided the chains are endblocked by oxyethylene. When the polymerization is effected employing propylene oxide and ethylene oxide, the respective alkylene oxides may be fed sequentially to provide sub-blocks of repeating units of the same type or they may be fed in admixture to provide a random distribution of units. The chains may also contain oxybutylene units provided such chains are also capped with oxyethylene. The terminal polyoxyethylene caps which endblock the polyoxyalkylene chains provide essentially only primary hydroxyl groups which in turn provide a more highly reactive polyether polyol for producing high resilience foam than polyols having terminal oxypropylene groups. The latter provide essentially only secondary hydroxyl groups (e.g., a ratio of secondary to primary hydroxyls of about 97 to 3).

Within the class of polyols defined by Polyol I, the generally preferred compositions are those having at least about 50 mole percent of primary hydroxyl groups based on the total moles of hydroxyl groups contained in the polyol. Usually the polyols have a primary hydroxyl content of no more than about 85 mole percent. The preferred hydroxyl functionality is at least 2.4. Most preferably, the minimum average number of hydroxyl groups per molecule is from about 2.8 to 3.2, and the maximum average hydroxyl functionality is about 4.8.

The average number of hydroxyl groups (i.e., functionality) in the polyether polyols encompassed by Polyol I is achieved by control of the functionality of the starter or mixture of starters used in producing the polyol. Thus, suitable starters or initiators of the alkylene oxide polymerization comprise compounds having an active hydrogen functionality (as hydroxyl or amino hydrogen) from about 3 to about 5, appropriate mixtures of such initiators with one another and/or with starters having an active hydrogen functionality outside of this range such as diols, hexols and the like. When a mixture of starters is used, the individual starters may be used in any relative proportions provided the average hydroxyl functionality of the polyether polyol produced therefrom is from 2.1 to about 5.

Suitable starters of the alkylene oxide polymerization include polyhydric compounds and primary and secondary polyamines having from three to five active hydrogen atoms (as —OH or —NH) and up to 15 carbon atoms. Illustrative of such starters are any of the following which may be employed individually or in combination with one another: glycerol; 1,2,6-hexanetriol; 1,1,1-trimethylolethane; 1,1,1-trimethylolpropane; 3-(2-hydroxyethoxy)- and 3-(2-hydroxypropoxy)-1,2-propanediols; 2,4-dimethyl-2-(2-hydroxyethoxy)methyl-pentanediol-1,5; 1,1,1-tris[(2-hydroxyethoxy)methyl]ethane; 1,1,1-tris[(2-hydroxypropoxy)methyl]propane; erythritol; pentaerythritol; ethylenediamine; and diethylenetriamine. As is evident, the employment of one or more of such triols, tetraols and polyamines as the initiator of alkylene oxide polymerization provides polyether polyols having an average hydroxyl functionality from 3 to 5.

Polyether polyols within the scope of Polyol I including those having an average of 2.1 hydroxyl groups per molecule, may also be prepared by the employment of any of the above initiators in combination with initiators having an active hydrogen functionality as low as two and more than five such as one or more of the following: ethylene glycol; diethylene glycol; propylene glycol; dipropylene glycol; 1,5-pentanediol; hexylene glycol; sucrose; sorbitol; methylglycoside; and the like.

In the high resilience foam-producing reaction mixtures described herein, the above-described polyether polyols referred to as Polyol I may be used as essentially the sole type of polyether polyol reactant or they may be employed in combination with other polyols to control the degree of softness or firmness of the foam and to vary the load-bearing properties. For example, when softer grade high-resilience foams are desired, Polyol I may be used in combination with polyether diols such as lower alkylene oxide adducts of a dihydric initiator such as propylene glycol and dipropylene glycol. However, when firm grades of high-resilience foams having enhanced load-bearing properties are desired, the organic polyol reactant of the foam formulation preferably comprises a polymer/polyether polyol in addition to Polyol I. The polymer/polyols are produced by the in situ polymerization of at least one ethylenically unsaturated monomer in a polyether polyol. For convenience, the polymer/polyols are referred to herein as Polyol II. Such polyols have hydroxyl numbers from about 18 to about 65. In the preferred high resilience formulations employed in the practice of the present invention, the organic polyol reactant is constituted of from about 40 to about 80 weight percent of those polyether polyols encompassed by Polyol I and correspondingly from about 60 to about 20 weight percent of the polymer/polyols encompassed by Polyol II. Usually, the high resilience formulation contains no more than about 50 weight percent of polymer/polyol based on the weight of total polyol reactant contained in the formulation.

In forming the polymer/polyols, one or more ethylenically unsaturated monomers is dissolved or dispersed in a polyether polyol and the polymerization is effected in the presence of a free radical catalyst. Especially suitable substrate polyols for producing such compositions are those polyether polyols encompassed by the definition of Polyol I. Also useful but less preferred as the substrate polyol are conventional polyether polyols outside the scope of Polyol I, that is polyether polyols not having the high primary hydroxyl content of Polyol I. Such additional substrate polyols may have average hydroxyl functionalities from 2 to 5 and hydroxyl numbers from about 20 to about 125, and are produced by initiating the alkylene oxide polymerization (preferably propylene oxide, ethylene oxide and combinations thereof) with any initiator having an active hydrogen functionality of at least two. Illustrative of the ethylenically unsaturated monomers are vinyl compounds having the general formula,

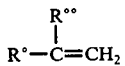

wherein: R° is hydrogen, methyl or any of the halogens (i.e., fluorine, chlorine, bromine or iodine); and R°° is R°, cyano, phenyl, methyl-substituted phenyl, carboalkoxy, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alphamethylstyrene, methyl methacrylate, and butadiene. In general, such compositions are prepared by polymerizing the monomers in the substrate polyol at a temperature between about 40° C. and about 150° C. employing any freeradical-generating initiator including peroxides, persulfates, percarbonates, perborates and azo compounds. Illustrative of suitable initiators are: hydrogen peroxide, dibenzoyl peroxide, benzoyl hydroperoxide, lauroyl peroxide and azobis (isobutyronitrile).

The polymer/polyol compositions generally contain from about 3 to about 50, and more usually no more than about 40, weight percent of the vinyl monomer or monomers polymerized in the substrate polyether polyol. Especially effective polymer/polyols encompassed by Polyol II are those having the following composition:

A. from about 10 to about 30 weight percent of a copolymer of (1) acrylonitrile or methacrylonitrile, and (2) styrene or alpha-methylstyrene, the said copolymer containing from about 40 to 85 and from about 60 to 15 weight percent of monomeric units of (1) and (1), respectively; and B. from about 90 to about 70 weight percent of one or more of the aforementioned types of substrate polyether polyols of which the polyols encompassed by Polyol I are especially preferred.

The isocyanate reactant of the high resilience foam formulations employed in the practice of the present invention may be any of the polyisocyanates known to the art of cellular polyurethane formation. Generally useful are organic polyisocyanates having an —NCO functionality of at least two and include aliphatic and aromatic polyisocyanates which are discrete chemical compounds, polyfunctional isocyanates produced as residue products in the manufacture of such compounds or polymeric aryl isocyanates, including any combination thereof. Among such suitable polyisocyanates are those represented by the general formula:

wherein: $i$ has an average value of at least 2 and is usually no more than 6, and Q' represents an aliphatic, cycloaliphatic or aromatic radical which can be an unsubstituted hydrocarbyl group or a hydrocarbyl group substituted, for example, with halogen or alkoxy. For example, Q' can be an alkylene, cycloalkylene, arylene, alkyl-substituted cycloalkylene, alkarylene or aralkylene radical including corresponding halogen- and alkoxy-substituted radicals. Typical examples of such polyisocyanates for use in preparing high resilience polyurethane foam as described herein are any of the following including mixtures thereof: 1,6-hexamethylenediisocyanate; 1,4-tetramethylenediisocyanate; bis(2-isocyanatoethyl)fumarate; 1-methyl-2,4-diisocyanatocyclohexane; methylene-4,4'-diphenyldiisocyanate, commonly referred to as "MDI"; phenylene diisocyanates such as 4-methoxy-1,4-phenylenediisocyanate, 4-chloro-1,3-phenylenediisocyanate, 4-bromo-1,3-phenylenediisocyanate, 5,6-dimethyl-1,3-phenylenediisocyanate and 6-isopropyl-1,3-phenylenediisocyanate; 2,4-tolylene diisocyanate and 2,6-tolylene diisocyanate including mixtures of these two isomers as well as crude tolylene diisocyanate;

isophoronediisocyanate; methylene-4,4'-dicyclohexyldiisocyanate; durylene diisocyanate; triphenylmethane-4,4', 4"-triisocyanate; and other organic polyisocyanates known to the polyurethane art. Of the aforesaid types of polyisocyanates, those containing aromatic nuclei are generally preferred.

Also useful as the polyisocyanate reactant are polymeric aryl isocyanates having units of the formula:

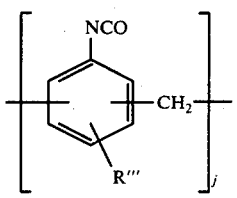

wherein R''' is hydrogen and/or lower alkyl (e.g., methyl), and $j$ has an average value of at least 2.1. Usually R''' is hydrogen and $j$ has an average value no higher than about 4. Particularly useful polymeric aryl isocyanates of this type are the polyphenylmethylene polyisocyanates produced by phosgenation of the polyamine obtained by acid-catalyzed condensation of aniline with formaldehyde. They are low viscosity (50–500 centipoise at 25° C) liquids having average isocyanato functionalities in the range of about 2.25 to about 3.2 or higher, and free —NCO contents of from about 25 to about 35 weight percent, depending upon the specific aniline-to-formaldehyde molar ratio used in the polyamine preparation. Suitable polymeric isocyanates of this type for use in the practice of this invention are those available commercially as PAPI 901 (The Upjohn Company) and NIAX Isocyanate AFPI (Union Carbide Corporation).

Also useful as polyisocyanate reactants are tolylene diisocyanate residues obtained from the manufacture of the 2,4- and 2,6- isomers of tolylene diisocyanates, and having a free —NCO content of from about 30 to about 50 weight percent. For example, as is known, tolylene diisocyanate is commercially made by reacting toluene and nitric acid to form the 2,4- and 2,6-dinitrotoluene isomers, hydrogenating and then phosgenating, typically in a solvent such as dichlorobenzene, to provide the conventional mixture of 80 percent 2,4-tolylene diisocyanate and 20 percent 2,6-tolylene diisocyanate. After removal of the solvent, the crude product undergoes a further evaporation in a still, with the refined or pure tolylene diisocyanate coming over. The evaporator tails remaining are black in color and extremely viscous, even often solid, materials. It is the evaporator tail material which is commonly referred to as tolylene diisocyanate residue.

Other useful polyisocyanate reactants are "liquid MDI", and combinations of diisocyanates with polymeric isocyanates having an average of more than two isocyanate groups per molecule. Illustrative of such combinations are: a mixture of 2,4-tolylene diisocyanate, 2,6-tolylene diisocyanate and the aforesaid polyphenylmethylene polyisocyanates and/or the aforementioned tolylene diisocyanate residue product.

Especially useful as the polyisocyanate reactant of the high resilience foam formulations described herein are combinations of isomeric tolylene diisocyanates and the above-described polymeric aryl isocyanates. Employed with particular advantage are mixtures containing from about 60 to about 90 weight percent of the isomeric tolylene diisocyanates and from about 40 to about 10 weight percent of the polyphenylmethylene polyisocyanates, in order to enhance the average —NCO functionality and thus the reactivity of the reaction mixture. When the high resilience formulations contain the isomeric diisocyanates as essentially the sole source of reactive —NCO, it is often desirable to include minor amounts of cross-linking agents, such as up to about 1.5 parts by weight per one hundred parts of polyol reactant.

On a combined basis, the polyol reactant and organic polyisocyanate usually constitute the major proportion by weight of the polyurethane-forming reaction mixture. In general, the polyisocyanate and polyol reactants are employed in relative amounts such that the ratio of total —NCO equivalents to total active hydrogen equivalent (of the polyol and water present as a blowing agent) is from 0.8 to 1.5, usually from 0.9 to 1.35, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from 80 to 150, and is usually within the range from about 90 to about 135. More usually, the Isocyanate Index is no more than about 115.

The high resilience foam-forming reaction is effected in the presence of a catalytically effective amount of a catalyst comprising an amine which is usually a tertiary-amine. Among the suitable classes of suitable amine catalysts are those consisting of carbon, hydrogen and amino nitrogen. Illustrative of such suitable hydrocarbyl amine catalysts are the following mono- and polyamines: trimethylamine; triethylamine; tributylamine; N,N-dimethylcyclohexylamine; N,N-dimethylbenzylamine; triethylenediamine; N,N,N',N'-tetramethylethylenediamine; N,N,N',N'-tetraethylethylenediamine; N,N,N',N'-tetramethyl-1,3-butanediamine; and 1,1,4,7,7-pentamethyldiethylenetriamine.

Another class of suitable tertiary-amines which may be present in the catalyst systems of the present invention are the beta-amino carbonyl compounds described in U.S. Pat. No. 3,821,131 such as, in particular, the 3-dialkylamino-N,N-dimethylpropionamides. Of this class, 3-dimethylamino-N,N-dimethylpropionamide is a particularly effective component of the catalyst system of high resilience foam formulations.

A third class of suitable tertiary-amine catalysts are bis[2-(N,N-dimethylamino)alkyl]ethers such as, in particular, bis[2-(N,N-dimethylamino)alkyl)ethyl]ether. Also useful is distilled residue product formed in the manufacture of the latter compound by the method of copending application Ser. No. 477,810, filed June 10, 1974, in the names of J. F. Ferrell and F. Poppelsdorf, now U.S. Pat. No. 3,957,875, granted May 18, 1976.

Other classes of tertiary-amines which are suitably employed as catalysts of the high resilience formulations described herein are: N,N-dialkylalkanolamines such as, in particular, N,N-dimethylethanolamine; the beta-aminopropionitriles described in copending application Ser. No. 369,556, filed June 13, 1973, now U.S. Pat. No. 3,925,268, granted Dec. 9, 1975, such as, in particular, 3-dimethylaminopropionitrile; and saturated heterocyclic tertiary-amines such as N-methylmorpholine, N-ethylmorpholine, 1,4-dimethylpiperazine and N-(2-hydroxyethyl)piperazine.

It is to be understood that the amine catalyst system of the high resilience foam formulation may comprise a combination of any of the above tertiary-amines such as a combination of the aforementioned triethylenediamine, bis[2-(N,N-dimethylamino)ethyl]ether and 3-dimethylamino-N,N-dimethylpropionamide. The amine catalyst is present in the final urethane-producing reaction mixture in a catalytically effective amount. Generally, the concentration of total amine is within the range from about 0.02 to about 6 parts by weight (exclusive of any carrier solvent such as dipropylene glycol or other non catalytic additive) per one hundred parts by weight of the total polyol reactant (p.p.h.p.) contained in the reaction mixture. Usually, the total amine concentration is from about 0.05 to about 4 p.p.h.p.

It if often desirable to include as a further component of the foam-forming reaction mixture a minor amount of an organic compound of tin. Such supplementary tin catalysts include any of the following: stannous salts of carboxylic acids such as stannous octoate; stannous oleate, stannous acetate and stannous laurate; dialkyltin dicarboxylates such as dibutyltin dilaurate, dibutyltin diacetate, dilauryltin diacetate, dibutyltin di(2-ethylhexanoate), dibutyltin maleate, dioctyltin diacetate, and the like; as well as dialkyltin oxides, trialkyltin oxides, tin mercaptides such as, for example, di-n-octyl tin mercaptide, and the like. Of these, the dialkyltin salts of carboxylic acids are especially suitable. When a tin compound is used as a co-catalyst, the concentration thereof is generally from about 0.001 up to about 2 parts by weight per 100 parts by weight of total polyol reactant contained in the high resilience foam formulation.

Foaming is accomplished by the presence in the foam formulation of varying amounts of a polyurethane blowing agent such as water which, upon reaction with isocyanate, generates carbon dioxide in situ, or through the use of blowing agents which are vaporized by the exotherm of the reaction, or by a combination of the two methods. These various methods are known in the art. Thus, in addition to or in place of water, other blowing agents which can be employed in providing high resilience foam as described herein include methylene chloride, liquefied gases which have boiling points below 80° F. and above −60° F., or other insert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon agents suitable for use in foaming formulations of this invention include: trichloromonofluoromethane; dichlorodifluoromethane; dichloromonofluoromethane; 1,1-dichloro-1-fluoroethane; 1,2,2-trifluoro-1,1,2-trichloroethane; 1,1,1-trifluoro-2-fluoro-3,3-difluoro-4,4,4-trifluorobutane; hexafluorocyclobutene; octafluorocyclobutane; and the like.

The generally preferred method of foaming is the use of water as the sole source of blowing action or a combination of water plus a fluorocarbon blowing agent such as trichlorofluoromethane. When water is used as the sole or partial source of blowing action, generally no more than about 10 p.p.h.p. of water is introduced to the foam system, the more usual water concentration being from about one to about 4 p.p.h.p. High resilience foam is most usually all water blown. When a fluorocarbon blowing agent is used in conjunction with water, the fluorocarbon is usually used in a minor proportion such as up to about 10 weight percent of total blowing agent.

The relative amounts of the various components present in the foam-producing reaction mixture are not narrowly critical. The organic polyol reactant and polyisocyanate reactant are present in the foam-producing formulation in a major amount. The relative amounts of these two components is the amount required to produce the urethane structure of the foam and such relative amounts are well known in the art. The source of the blowing action such as water, auxiliary blowing agents, catalyst and the morpholino-bearing polyalkylsiloxane foam stabilizer are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the morpholino-bearing polyalkylsiloxanes of this invention are present in a foam-stabilizing amount, that is, in an amount sufficient to stabilize the foam. The preferred amounts of these various components are as given hereinabove.

If desired, other additional ingredients can be employed in minor amounts in producing high resiliency foam in accordance with the teachings of this invention. Illustrative of such additional components are inhibitors as exemplified by 2,6-di-tert-butyl-4-methylphenol ("Ionol"), added for the purpose of reducing any tendency of the foam to hydrolytic or oxidative instability. Flame retardants can also be used such as, for example, tris(2-chloroethyl)phosphate, as well as other flame retardants such as those described in U.S. Pat. No. 3,846,462 (beginning with column 34, line 29, through column 35, line 34) the disclosure of which in this respect is incorporated as part of the present disclosure by reference thereto.

Other components which may be present in the high resilience foam formulations described herein are polyalkylsiloxane oils such as dimethylsiloxane oils. The latter may be added as such to the foam formulation or they may be introduced as components of the morpholinoalkyl- and morpholinoalkoxylalkyl-polyalkylsiloxanes of the invention. For example, the equilibrated polyalkylsiloxane hydrides employed as hydrosilating agents in the preparation of the siloxanes of the invention may contain dimethylsiloxane species or such species may form during the preparation of the siloxanes of the invention by equilibration reactions as previously described herein. The high resilience foam formulations described herein may also contain the organosilicones described in the aforementioned U.S. Pat. Nos. 3,741,917 and 3,839,384, and Belgian Pat. Nos. 809,978 and 809,979. While the addition of such dimethylsiloxane oils or other organosilicones is not required, they may help expand the usefulness of the morpholino-bearing polyalkylsiloxanes described herein by increasing their adaptability to a variety of foam formulations.

Illustrative of further additives that can be present in the high resilience foam formulations employed in the practice of the invention are: cross-linking agents such as glycerol, diethanolamine, triethanolamine and their oxyalkylene adducts; additives to enhance load-bearing properties; carrier or solvent media for the amine catalyst (e.g., dipropylene glycol) and for the morpholino-bearing polyalkylsiloxanes of the invention; as well as fillers, dyes, pigments, anti-yellowing agents, and the like.

The foam stabilizers comprising the morpholino-bearing polyalkylsiloxanes of the invention may be introduced to the high resilience formulations as a 100 percent active stream or they can be added in dilute form in suitable carrier and solvent media. For example, it may be desirable, particularly in commercial operation to employ the siloxane fluids of the invention in a diluted form, that is in the form of a siloxane fluid-solvent solution premix or a siloxane fluid-solvent-catalyst solution premix. Such solution premixtures can help serve to eliminate any mixing, metering, or settling problems. Moreover, fewer streams of ingredients may be needed at the mixing head of the operational apparatus. Of considerable importance is that the formulator has the latitude to select the particular solvent which best suits the system and minimize or eliminate any loss of foam properties. Siloxane fluid-solvent-catalyst premixes can also be used since the selected solvent can be one which serves the dual role of solvent for the catalysts as well as the siloxane fluid. This option of formulating a premix simplifies the foaming operation and improves the precision of metering ingredients.

Illustrative of suitable types of diluents for the Q-modified polyalkylsiloxanes of the invention are: normally liquid aliphatic and aromatic unsubstituted and halogen-substituted hydrocarbons (e.g., heptane, xylene, toluene, chlorobenzenes, and the like); and normally liquid oxygen-containing compounds such as dialkylphthalates (e.g., dioctylphthalate), mono-ols, diols, triols and other polyols including the polyether polyols described above as Polyol I, as well as non ionic and anionic silicon-free organic surfactants, and any combination of such oxygen-containing liquid materials. When employed, the diluent selected is preferably one in which the morpholinoalkyl- or morpholinoalkoxyalkyl-polyalkylsiloxane fluid is substantially soluble. For example, it is preferred that at least five parts by weight of the Q-modified siloxane oil be soluble in 95 parts by weight of diluent. More preferably, the minimum percentage of Q-modified siloxane fluid in the siloxane fluid-solvent or siloxane fluid-solvent-catalyst solutions should be in the range of at least about ten to at least about 30 weight percent. It is to be understood, of course, that such solvents need not be employed and that the maximum percentage of Q-modified siloxane fluid in said solvent solutions is not critical. Moreover, when employed, such solvent solutions should of course be correlated to the amount of active Q-modified siloxane fluid that may be employed per one hundred parts by weight to total organic polyol reactant as outlined above. The same correlation should also be made with regard to catalyst when a siloxane fluid-solvent-catalyst solution is employed. Preferably the solvent for the morpholino-bearing siloxane fluid is a hydroxyl-substituted organic compound such as hydroxyl-terminated organic ether compounds. More preferably they are polyether mono-ols or polyether polyols.

One class of suitable hydroxy-substituted organic solvents for the morpholinoalkyl- and morpholinoalkoxyalkyl-polyalkylsiloxanes of the invention are mixed ethylene oxide-propylene oxide adducts of butanol having the average formula, $C_4H_9(OC_3H_6)_m(OC_2H_4)_nOH$, where $n$ has an average value from about 3 to about 50 and $m$ has an average value from about 3 to about 40. Preferably, the values of $m$ and $n$ are such that the average molecular weight of these mono-ols is not substantially greater than about 2000 and the oxyethylene content is from about 20 to about 80 weight percent, based on total polyoxyalkylene content. Usually, the values of $m$ and $n$ are chosen such that the weight percent of oxyethylene is about the same as the weight percent of oxypropylene.

Another class of suitable solvents for the morpholinoalkyl- and morpholinoalkoxyalkyl-polyalkylsiloxanes of the invention are organic surfactants which, when used, are usually of the non ionic variety. Such non ionics include: the polyoxyethylene ethers of higher alcohols having from 10 to 18 carbon atoms including mixtures thereof; and polyoxyethylene ethers of alkyl-substituted phenols. Typical of such non ionic organic surfactants for use as the carrier medium for the siloxanes described herein are the ethylene oxide adducts of nonylphenol having the average composition, $C_9H_{19}$—$C_6H_4$—$(OC_2H_4)_t$—OH, wherein $t$ has an average value from about 4 to about 20, inclusive of whole and fractional numbers, such as 6, 9, 10.5 and 15.

The generally preferred solvents for the morpholinoalkyl- and morpholinoalkoxyalkyl-polyalkylsiloxanes of the invention are: polyether triols such as glycerol-started poly(oxypropylene); and the above-described class of polyether polyols having a primary hydroxyl content of at least about 35 mole percent, that is, the polyether polyols defined hereinabove as Polyol I.

The high resilience foam produced in accordance with the method of this invention can be produced by techniques known to the cellular urethane art. The preferred technique is the one-step or one-shot process wherein all of the formulation components are reacted simultaneously with the foaming operation. It is to be understood that the ingredients of the foam-forming formulation can be mixed in any suitable manner prior to commencing the cure reaction. Sometimes it is preferred to employ various premixes such as a premixture of the organic polyol reactant and Q-modified polyalkylsiloxane fluid stabilizer; a premixture of the organic polyol reactant, siloxane fluid stabilizer, blowing agent and catalyst; a premixture of the polyisocyanate and siloxane fluid stabilizer; a premixture of the siloxane fluid stabilizer, solvent and amine catalyst; and the like. Because of the high exothermic nature of the urethane-forming reaction, high resilience urethane foams are rapidly produced without the need to apply an external source of heat to obtain a satisfactory cure of the foam product whether slabstock or molded. Of course, if desired, the overall reaction can be even further accelerated by preheating the mold in the case of forming molded high resilience foam and/or by applying conventional high temperature post curing procedures. With or without post cure, however, high resilience foam formation achieves a greater degree of cure throughout the entire foam and shorter tack free and demolding times, than is generally achieved in forming conventional flexible polyether slabstock and molded foam.

The polyurethanes produced in accordance with the teachings of this invention can be employed as a cushioning material such as for automobile seat cushions and furniture cushions, interior automotive padding mattresses, as well as in carpeting and other end use applications associated with cellular polyurethanes generally.

The following examples are illustrative of the present invention.

It is to be understood that in the formulas included in the data which follows, "Me" designates methyl (—$CH_3$).

Except as noted, the platinum catalyst employed to effect the hydrosilation reactions described under part (B) of each of the following Examples 1 and 2, was prepared by reacting 10 grams of chloroplatinic acid hexahydrate and 100 grams of octanol at an elevated temperature and reduced pressure. After removal of octanol by distillation (45° C./0.3 mm. pressure), the residual product (35.3 grams) was dissolved in toluene. As used in the examples, the expression "reduced platinum catalyst solution" refers to the resultant toluene solution of the chloroplatinic acid-octanol reaction product and contains about 0.014 gram of platinum per gram of solution

EXAMPLE 1

This example describes an illustrative 3-(morpholino)propyl-modified polymethylsiloxane oil of the invention, designated herein as Polymer A.

A. Preparation of Si-H Reactant

The polymethylsiloxane hydride employed in preparing Polymer A was formed by equilibration of a reaction mixture containing the following Reactants (1), (2) and (3).

Reactant (1): Hexamethyldisiloxane in an amount of 48.6 grams (0.3 mole), corresponding to a total of 0.6 mole of $Me_3SiO_{1/2}$.

Reactant (2): Dimethylsiloxane cyclic polymers (purity 99+ percent) in an amount of 60.9 grams, corresponding to 0.82 mole of $Me_2SiO_{2/2}$.

Reactant (3): Polymeric methylsiloxane hydride in an amount of 21.6 grams, corresponding to 0.36 mole of $Me(H)SiO_{2/2}$.

The reaction mixture was equilibrated at ambient temperature while stirring overnight (about 18 hours) in the presence of concentrated sulfuric acid (about 2.5 grams). The equilibrated product was then stirred for about 6 hours with several grams of sodium bicarbonate, treated with filter aid and activated charcoal and then pressure filtered. Based on the relative molar proportions of Reactants (1), (2) and (3), normalized to two moles of monofunctional units, the equilibrated product comprises a polymer having the following average empirical formula,

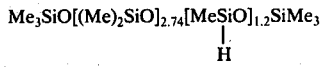

B. Preparation of Polymer A

To a 100 ml. three-necked reaction flask fitted with a heating mantle, magnetic stirrer, thermometer, condenser and nitrogen blow-by, there were added 36.4 grams of the polysiloxane hydride described under part (A) of this example corresponding to about 0.1 mole of $Me(H)SiO_{2/2}$. Heat was then applied to raise the temperature to 124° C. and N-allylmorpholine (16.0 grams, 0.126 mole) containing about 0.25 ml. of reduced platinum catalyst solution was gradually added over a period of five minutes. After a total reaction time of fifteen minutes (maximum temperature, 145° C.) a standard analysis (KOH—$C_2H_5OH$—$H_2O$) for silanic hydrogen content was negative. The reaction mixture was then cooled to ambient temperature, treated with sodium bicarbonate, filter aid and activated charcoal, and then pressure filtered. The product was a clear, almost waterwhite fluid. Based upon the above-assigned average composition of the polysiloxane hydride employed in its preparation, the product comprises a 3-(morpholino)-propyl-modified polymethylsiloxane having the following average composition,

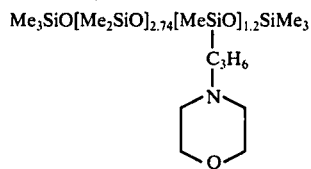

The product of this example is referred to herein as Polymer A.

EXAMPLE 2

This example describes a further illustrative 3-(morpholino)propyl-modified polymethylsiloxane oil of the invention, designated herein as Polymer B.

A. Preparation of Si—H Reactant

The polymethylsiloxane hydride employed in preparing Polymer B was formed by equilibration of a reaction mixture containing reactants (1), (2) and (3) identified below.

Reactant (1): Hexamethyldisiloxane in an amount of 274.5 grams (1.7 moles), corresponding to a total of 3.4 moles of $Me_3SiO_{1/2}$.

Reactant (2): Dimethylsiloxane cyclic polymers in a total amount of 317.7 grams (purity, 96 weight percent). Based on the 96 percent content of cyclics, the aforesaid amount of this reactant corresponds to 4.1 moles of $Me_2SiO_{2/2}$.

Reactant (3): Polymeric methylsiloxane hydride in an amount of 157.8 grams, corresponding to 2.6 moles of $Me(H)SiO_{2/2}$.

The reactant mixture was equilibrated with stirring for 2 hours at about 85° C. in the presence of trifluoromethylsulfonic acid (about 150 drops). The equilibrated product was then neutralized with sodium bicarbonate (45 grams) and filtered. The filtered product had a viscosity of 2.24 centistokes (at 25° C.). Based on the relative molar proportions of Reacants (1), (2)and (3), normalized to two moles of monofunctional units, the equilibrated product comprises a polymer having the following average empirical formula,

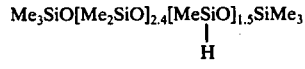

B. Preparation of Polymer B

To a 100 ml. three-necked reaction flask fitted with a heating mantle, magnetic stirrer, thermometer, condenser and nitrogen blow-by, there was added 29.0 grams of the polysiloxane hydride described under part (A) of this example corresponding to about 0.1 mole of $Me(H)SiO_{2/2}$. The flask was heated to 95° C. and N-allylmorpholine (16 grams, 0.126 mole) containing 0.25 ml. of reduced platinum catalyst solution was gradually added. Initial addition caused a rapid exotherm to 130° C. The temperature was maintained at 120° to 130° C. by the rate of addition. When the temperature dropped to less than 120° C., additional platinum catalyst was added causing the reaction mixture to re-exotherm to a maximum temperature of 136°0 C. After about six minutes of total reaction time, the standard test for silanic hydrogen showed the presence of 0.6 ml. of hydrogen per 0.45 ml. of sample. The system was recatalyzed and about 0.5 ml. of additional Z-allylmorpholine was added. After further reaction for about 50 minutes, the Si—H content was 0.6 ml. of hydrogen per 0.48 ml. of sample. N-allylmorpholine (1.0 gram) and several droplets of a 4 weight percent solution of chloroplatinic acid hexahydrate in dimethoxyethane were then added. After a further reaction period of about one hour, residual silanic hydrogen was 0.5 ml. $H_2$/0.5ml. of sample. Heating was then discontinued and the reaction mixture allowed to cool to room temperature after which it was treated with sodium bicarbonate, filter aid and activated charcoal, and pressure filtered. The product was a clear bright yellow fluid and is referred to herein as Polymer B. Based upon the above-assigned average composition of the polysiloxane hydride employed in its preparation, Polymer B comprises a 3-(morpholino)propyl-modified polymethylsiloxane having the following average composition,

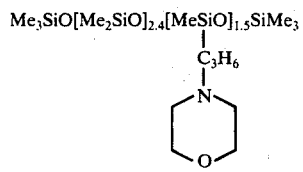

Analysis of Polymer B by nuclear magnetic resonance was consistent with this assigned composition.

EXAMPLE 3

The purpose of this example is to illustrate the utility of the polymer compositions of this invention in forming high-resilience foam. For this purpose, Polymer A of example 1 was used (in the form of a 22 weight percent solution in a polyether triol) as the foam stabilizing component of a high-resilience formulation. The other components of the formulation are identified in Table I which follows.

TABLE I
HIGH-RESILIENCE FOAM FORMULATION

| Component | Parts By Weight |
|---|---|
| Polyol A: An ethylene oxide-capped, glycerol-started poly(oxypropylene) triol having a Hydroxyl No. of about 34, a molecular weight of about 5000, and a primary hydroxyl content of 70–75 mole percent. | 60 |
| Polyol B: A polymer/polyether polyol having a Hydroxyl No. of about 28 and based on (parts by weight): styrene (10), acrylonitrile (10) and Polyol A (80) produced by polymerizing said monomers in Polyol A. | 40 |
| Polyisocyanate: A mixture of: (1) 80 weight percent of the 2,4- and 2,6-isomers of tolylene diisocyanate, the weight ratio of said isomers being 80:20, respectively; and (2) 20 weight percent of a polyphenyl-methylene polyisocyanate containing about 2.6 to 2.9 moles of -NCO per mole of polymer and having an average isocyanate content of about 31.4 weight percent. | 34.7 |
| Water | 2.6 |
| Dibutyltin dilaurate | 0.015 |
| Polymer A /1/ | 0.165 |
| Amine Catalyst System: | |
| Amine Catalyst A: A 33 weight percent solution of 3-dimethylamine-N,N-dimethylpropionamide in TERGITOL TP-9 /2/. | 0.30 |
| Amine Catalyst B: A 33 weight percent solution of triethylenediamine in dipropylene glycol. | 0.36 |
| Amine Catalyst C: Bis[2-(N,N-dimethylamino)- | 0.07 |

TABLE I-continued
HIGH-RESILIENCE FOAM FORMULATION

| Component | Parts By Weight |
|---|---|
| ethyl]ether. | |

/1/ Polymer A (described under example 1) was added to the formulation as a solvent solution in a glycerol-started poly(oxypropylene) triol having a Hydroxyl No. of about 56. The said solution contained 22 weight percent of Polymer A and 78 weight percent of said triol solvent and was used in an amount of 0.75 parts by weight per 100 parts by weight of total Polyol A and Polyol B contained in the formulation.
/2/ An ethylene oxide adduct of nonylphenol containing an average of 9 moles of ethylene oxide per mole of nonylphenol.

The procedure employed in preparing the foam of this example entailed the following manipulative steps: A blend of Polyols A and B was dispensed into a paper cup at about 20° to 30° C. Using a syringe, the solution of surfactant and the dibutyltin dilaurate were added to the polyol blend and dispersed therein with a spatula, followed by the addition of a premixture of the blowing agent (water) and amine catalysts which was also dispersed without using a baffle. The mixture was then placed under a drill press and agitated for ten seconds at 2150 revolutions per minute with circular movement of the cup to ensure proper mixing. Without interruption of the mixing cycle, the polyisocyanate reactant was added rapidly and mixing continued for an additional seven seconds. The foam forming mixture was then rapidly poured into a box (8 inches × 8 inches × 6 inches) supported by a wooden mold. The foam was allowed to rest in the supported container for at least two minutes after the apparent completion of foam rise to avoid densification at the bottom of the foam bun. While still in the box the foam was thereafter placed in an oven at 125° C. for 10 minutes to reduce tackiness and to facilitate removal of the foam. The foam was allowed to stand at ambient temperature for about one hour before cutting samples for breathability measurement. Breathability was determined by a Gurley Densometer which measures the porosity or air resistance of the foam as shown by the time in seconds for a given volume of air (300 cc's of air) to pass into a standard area of foam. The value recorded is the average value of five such measurements given in seconds per 300 cc's of displaced air.

The foam product provided with Polymer A of the invention and prepared as described above, was of good quality and breathability, as reflected by the following results of this Example 3:
Height of rise = 7.1 inches
Gurley breathability = 17.1 seconds
Top collapse = None
Bottom collapse = None
Cell fineness = Good
Cell uniformity = Good
Voids = None

EXAMPLE 4

In this example, the foam preparation described under Example 3 was repeated except that, in place of Polymer A, above-described Polymer B was employed as the surfactant component of the high-resilience foam formulation (Table I). Polymer B was also introduced to the formulation as a 22 weight percent solution in the polyether triol identified in footnote 1 of Table I. The said solution was used in an amount of 0.75 parts per 100 parts of Polyol A and Polyol B, thereby providing 0.165 parts of Polymer B to the formulation. The foam was prepared following the procedure described under Example 3. The results are as follows:

Height of rise = 5.5 inches
Gurley breathability = 3.9 seconds
Top collapse = 1.1 inches
Bottom collapse = None
Cells per inch = 24
Cell fineness = Good
Cell uniformity = Good
Voids = None The above results indicate that, although some settling (top collapse) occurred, Polymer B otherwise provided a void-free foam of satisfactory rise and breathability and good cell structure.

What is claimed is:

1. A method for producing polyurethane foam which comprises reacting and foaming a reaction mixture containing (1) an organic polyol reactant comprising a polyether polyol having an average hydroxyl functionality from 2.1 to about 5 and an average primary hydroxyl content from about 35 to about 90 mole percent, based on the total moles of hydroxyl groups contained in the polyether polyol, (2) an organic polyisocyanate, (3) a tertiary-amine catalyst, (4) a blowing agent, and (5) a surfactant component comprising a morpholino-bearing polyalkylsiloxane consisting essentially of (a) monofunctional siloxy units, M°, the respective silicon atoms of which have two alkyls bonded thereto, the third silicon-bonded organic group being alkyl or Q where Q is morpholinoalkyl or morpholinoalkoxyalkyl, (b) an average of from about 0.5 to about 8 moles of difunctional dialkylsiloxy units for every two moles of M°, and (c) from zero up to an average of about 8 moles, for every two moles of M°, of difunctional monoalkylsiloxy units in which the second organic group bonded to silicon is Q where Q is as aforesaid, provided the said siloxanes contain an average of at least about 0.5 and no more than about 8 moles of said silicon-bonded Q groups for every two moles of M°; and wherein the silicon-bonded alkyls have from one to four carbon atoms and the silicon-bonded Q groups have the formula,

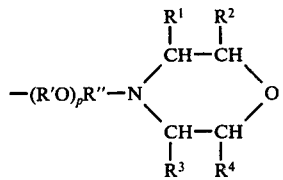

where $p$ is 0 or 1, Q being morpholinoalkyl when $p$ is 0 and morpholinoalkoxyalkyl when $p$ is 1, R' is bi-valent alkylene having from two or four carbon atoms, R'' is bivalent alkylene having from two to six carbon atoms, and $R^1$, $R^2$, $R^3$ and $R^4$ are independently hydrogen or alkyl having from one to four carbon atoms.

2. A method as defined in claim 1 in which said morpholino-bearing polyalkylsiloxane contains an average of at least about one and no more than about 6 moles of said difunctional dialkylsiloxy units and an average of no more than about 6 moles of the difunctional Q-substituted monoalkylsiloxy units.

3. A method as defined in claim 1 in which the said polyether polyol has a primary hydroxyl content of at least about 50 mole percent and an average hydroxyl functionality of at least about 2.8 and no more than about 4.8.

4. A method as defined in claim 1 in which said polyether polyol comprises a hydroxyl-terminated, glycerol-started poly(oxypropylene) ether capped with oxyethylene.

5. A method as defined in claim 1 in which the organic polyol reactant additionally comprises a polymer/polyether produced by the in situ polymerization of at least one ethylenically unsaturated monomer in a polyether polyol.

6. A method as defined in claim 5 in which the polyether polyol in which said ethylenically unsaturated monomer is polymerized is a polyether polyol having an average hydroxyl functionality from 2.1 to about 5 and an average primary hydroxyl content from about 35 to about 90 mole percent, based on the total moles of hydroxyl groups contained in said polyether polyol.

7. A method as defined in claim 1 in which the organic polyisocyanate reactant comprises a tolylene diisocyanate.

8. A method as defined in claim 1 in which the organic polyisocyanate is a polymeric aryl isocyanate having an average isocyanate functionality from about 2.25 to about 3.2.

9. A method as defined in claim 1 in which said organic polyisocyanate comprises tolylene diisocyanate residue obtained from the manufacture of the 2,4- and 2,6-isomers of tolylene diisocyanate.

10. A method as defined in claim 1 in which the blowing agent comprises water.

11. A method as defined in claim 1 in which the blowing agent comprises water and a halocarbon blowing agent.

12. A method as defined in claim 1 in which the reaction mixture additionally contains a dialkyltin dicarboxylate.

13. A method for producing high resilience polyurethane foam which comprises reacting and foaming a reaction mixture containing: (1) an organic polyisocyanate; (2) an organic polyol reactant which is constituted of (a) from about 40 to about 80 weight percent of a polyether polyol having an average hydroxyl functionality from 2.1 to about 5 and an average primary hydroxyl content between about 35 and about 90 mole percent, based on the total moles of hydroxyl groups contained in said polyether polyol and (b) from about 60 to about 20 weight percent of a polymer/polyether polyol produced by the in situ polymerization of an ethylenically unsaturated monomer in a polyether polyol; (3) a blowing agent comprising water; (4) a tertiary-amine catalyst; and (5) about 0.03 to about 3 parts by weight per one hundred parts by weight of the polyol reactant of a surfactant component comprising a 3-(morpholino)propyl-polymethylsiloxane consisting essentially of (i) monofunctional siloxy units, M°, the unit formula of which is at least one of the group consisting of $Me_3SiO_{1/2}$ and $(Q)(Me)_2SiO_{1/2}$, (ii) difunctional siloxy units, $Me_2SiO_{2/2}$, the mole ratio of $Me_2SiO_{2/2}:M°$ having an average value from about 0.5:2 to about 8:2, and (iii) difunctional siloxy units, $(Q)(Me)SiO_{2/2}$, the mole ratio of $(Q)(Me)SiO_{2/2}:M°$ being zero up to an average value of about 8:2, provided the average value of the mole ratio of Q:M° is at least about 0.5:2 and no more than about 8:2, wherein Me in each occurrence is methyl and Q in each occurrence is silicon-bonded

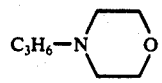

14. A method as defined in claim 13 in which the organic polyisocyanate reactant is constituted of from about 60 to about 90 weight percent of tolylene diisocyanate and from about 40 to about 10 weight percent of a polymeric aryl isocyanate having an average isocyanate functionality from about 2.25 to about 3.2.

15. A method as defined in claim 13 in which, in said 3-(morpholino)propyl-polymethylsiloxane, the monofunctional units, M°, are $Me_3SiO_{1/2}$, the average value of the mole ratio of $Me_2SiO_{2/2}:Me_3SiO_{1/2}$ is from about 1:2 to about 6:2, and the average value of the mole ratio of $(Q)(Me)SiO_{2/2}:Me_3SiO_{1/2}$ is from about 0.5:2 to about 6:2.

16. A method as defined in claim 13 in which said surfactant component is a solution of said 3-(morpholino)propyl-polymethylsiloxane in a polyether polyol.

* * * * *

UNITED STATES PATENT OFFICE
CERTIFICATE OF CORRECTION

Patent No. 4,067,828                    Dated January 10, 1978

Inventor(s) Bernard Kanner and Bela Prokai

It is certified that error appears in the above-identified patent and that said Letters Patent are hereby corrected as shown below:

In the ABSTRACT, next to the last line thereof, for "conprise" read -- comprise --. Column 6, line 68, for "perferred" read -- preferred --. Column 7, line 18, for "nore" read -- more --; line 54, after "are" read -- as --. Column 9, line 52, for "Q+r" read -- q+r --. Column 16, line 7, for "freeradical-" read -- free radical- --. Column 19, line 14, for "if" read -- is --; line 42, for "insert" read -- inert --. Column 21, line 48, for "to" read -- of --. Column 22, line 59, after "padding" read -- , --. Column 24, line 36, for "reactant" read -- reaction --; line 65, for "136°0 C." read -- 136°C. --. Column 25, line 1, for "Z-" read -- N- --; line 64, for "3-dimethylamine-" read -- 3-dimethylamino- --. Column 27, line 53, for "bi-valent" read -- bivalent --; line 54, for "or" read -- to --.

UNITED STATES PATENT OFFICE
CERTIFICATE OF CORRECTION

Patent No. 4,067,828          Dated January 10, 1978

Inventor(s) Bernard Kanner and Bela Prokai          Page 2 of 2

It is certified that error appears in the above-identified patent and that said Letters Patent are hereby corrected as shown below:

Column 28, line 7, after "polyether" read -- polyol --.

Column 29, lines 1-5, that portion of the formula reading $C_3H_6-$ should read $-C_3H_6-$ Signed and Sealed this Twenty-third Day of May 1978

[SEAL]

Attest:

RUTH C. MASON
*Attesting Officer*

LUTRELLE F. PARKER
*Acting Commissioner of Patents and Trademarks*